Dec. 29, 1931.　　J. A. LEONARD　　1,839,186
TRASH RACK RAKE
Filed July 24, 1930
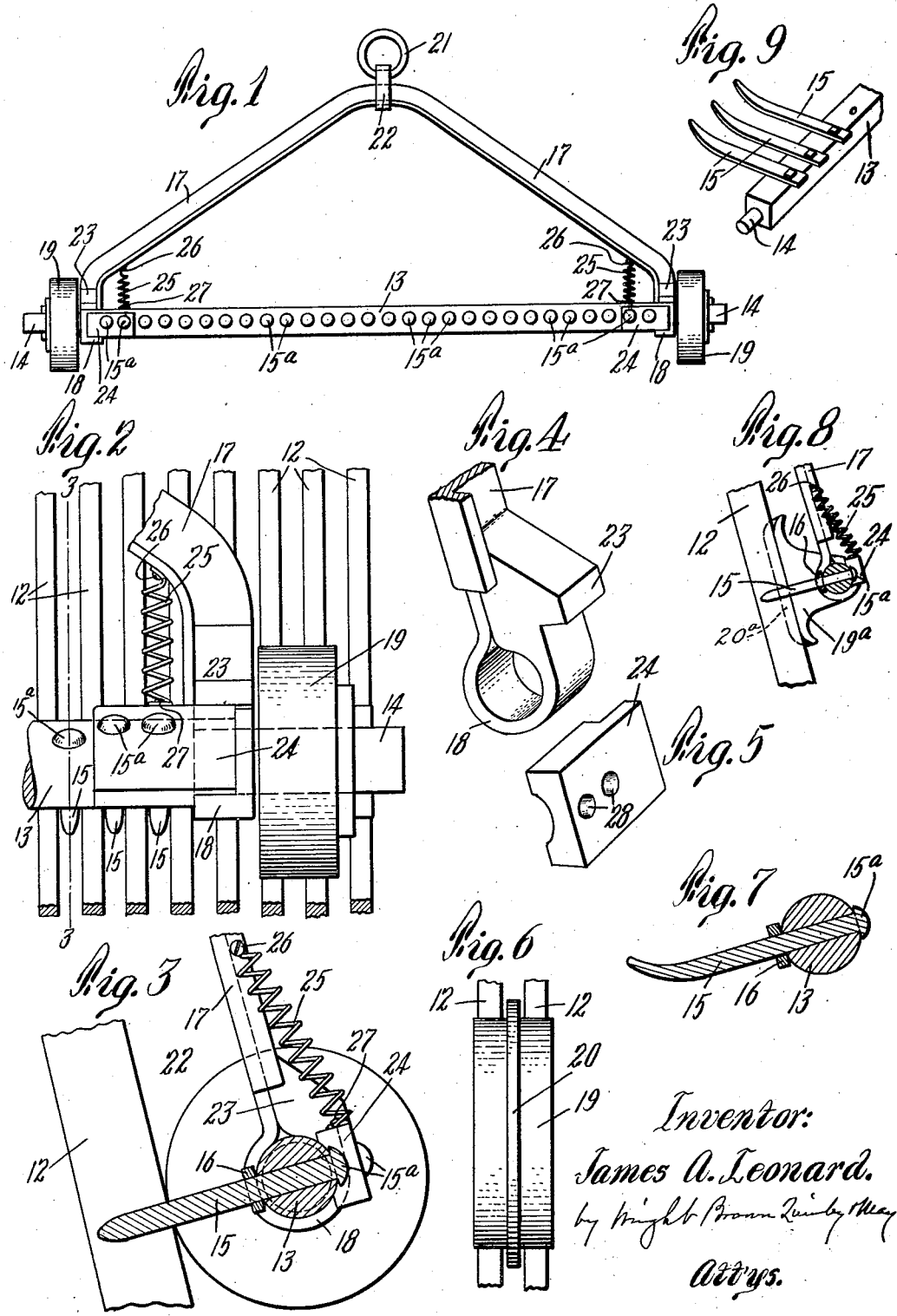

Patented Dec. 29, 1931

1,839,186

UNITED STATES PATENT OFFICE

JAMES A. LEONARD, OF BANGOR, MAINE

TRASH RACK RAKE

Application filed July 24, 1930. Serial No. 470,360.

This invention relates to a rake employed to remove trash from a rack or grating placed across the intake end of a mill race to arrest matter which would otherwise be carried through the race and be objectionable for well known reasons.

The object of the invention is to provide an efficient trash rake of durable and relatively inexpensive simple construction, having advantages hereinafter set forth.

Of the accompanying drawings forming a part of this specification,—

Figure 1 is a side view of a trash rack rake embodying the invention, looking toward the outer side.

Figure 2 is an enlargement of a portion of Figure 1, showing portions of the inclined bars of a trash rack or grating.

Figure 3 is a section on line 3—3 of Figure 2.

Figures 4 and 5 show in perspective, one of the bail dogs and one of the rake head lugs hereinafter described.

Figure 6 is a view similar to a portion of Figure 2, showing the wheel or traveler hereinafter described, provided with a peripheral fin.

Figure 7 is a view similar to a portion of Figure 3, showing a modification.

Figure 8 is a view similar to Figure 3, on a smaller scale, showing a modified form of traveler.

Figure 9 is a fragmentary perspective view, showing a portion of a modified form of the rake head and teeth.

The same reference characters indicate the same parts in all of the figures.

A trash rack is composed of spaced apart bars 12, said bars being usually inclined, as shown by Figures 3 and 8.

My improved rake is designed to cooperate with the rack, as next described.

13 designates an elongated rake head or shaft, which may be either tubular or solid, preferably the latter. Fixed to the head and projecting therefrom are rake teeth 15. In this instance, the rake head is provided with transverse sockets receiving the outer end portions of the teeth. Enlargements 15a, formed on the outer ends of the teeth, bear on the outer side of the head. Clamping nuts 16, engaged with the projecting inner end portions of the teeth are turned to a clamping bearing on the inner side of the head.

17 designates a bail preferably composed of a bar of strap or angle iron bent to the V-shape shown by Figure 1, the apex of the V constituting the upper end of the bail, and the ends of the bar collectively constituting the lower end of the bail, which is provided with spaced apart bearings 18 in which are journaled alined axle arms 14, formed on the ends of the head 13 and coaxial therewith. The upper end of the bail, formed by the apex thereof, is provided with means for engagement with an operating cable whereby the rack may be raised and lowered, said means being here shown as a ring 21, secured to the bail by a strap 22. The cable is operable to raise and lower the rake on a rack, said cable permitting swinging movements of the rake toward and from the rack while it is being raised and lowered, so that the rake is conformable to a mass of débris on any portion of the rack.

Journalled on the axle arms are wheels 19, whose peripheries are adapted to run on bars of the rack. The teeth project outward from the peripheries of the wheels sufficiently to enter spaces between other rack bars. The axis of the rake head and the peripheries of the wheels are concentric with each other, as shown by Figure 3, so that the projection of the teeth from said peripheries is invariable and is not affected by swinging movements of the bail, the object of this arrangement being hereinafter stated.

The bail and head are provided with complemental stop members adapted to positively support the teeth 15 in a load-raising position, and separable from each other to permit the teeth to yield when the rake is falling. In this instance the said stop members are provided by dogs 23, fixed to the bail adjacent the bearings 18, and lugs 24 fixed to the shaft and adapted to abut the dogs, as indicated by Figures 2 and 3. I provide automatic forcing means adapted to force the teeth toward a load-raising position and cause them to dig into a mass of débris on the rack during the initial upward movement of the rake, the teeth commencing to dig into or penetrate the débris at the moment the rake commences to rise, and continuing to penetrate until they firmly engage the débris. In this instance, said automatic means is embodied in springs 25 connected at 26 with the bail, and at 27 with the head 13 and adapted to urge the lugs toward the dogs, and at the same time cause the points of the teeth to dig into the mass of débris. The lower portion of the trash rack is the portion through which a free flow of water is very important so that the thorough cleaning of the portion is highly desirable. This lower portion is frequently obstructed by a tough interwoven mat of leaves, twigs, and other waterlogged matter, compacted by the pressure of the water and seriously restricting the flow of water. This mat is usually in the form of a bank bearing on the bottom of the stream and on the lower portion of the upstream side of the rack, the bank presenting a surface which joins the rack at its upper edge and is inclined upstream from the rack to the bottom. The rake flexibly supported as above described, bears on the inclined side of the bank of débris when the rake is fully lowered, the wheels bearing on the inclined side of the bank, and the teeth being swung upwardly by contact with the bank while the rake is falling. The moment the rake commences to rise, the automatic forcing means, here embodied in the springs 25, acts to cause the points of the teeth to dig into the bank, instead of sliding inoperatively upward on the inclined side thereof, without digging into the débris, as might be the case without said means. The teeth are therefore caused to positively penetrate the débris until they are sufficiently engaged therewith to lift it. When the rake is falling and the cable is relatively loose, the bail 17 is liable to swing inward toward and bear on the bank of débris, and when the cable is pulled upward to raise the rake, the pull of the cable causes the bail to swing outward from the bank until the bail is alined with the cable.

The above described arrangement of the peripheries of the wheels 19 concentric with the axis of the rake head or shaft 13, prevents the outward swinging of the bail from drawing the points of the teeth outward and away from the bank of débris, the points of the teeth remaining in contact with the bank and ready to dig into the same when the rake commences to rise.

If desired, each wheel 19 may be provided with a peripheral fin 20, adapted to enter the space between two adjacent rack bars. Usually however, the fin is not required.

The rake can be used on any existing racks without change of the racks, thus adapting it for any plant, new or old.

The rake will not only handle leaves, grass, chips and other débris, but will grab and pull to the surface water-logged 4-foot pulpwood.

It may be operated by a standard electric hoist of low cost which is easily and cheaply installed.

The solid rake head 18 may be square or of other polygonal form in cross section, and the teeth 15 may bear on one side of the head and be attached thereto by bolts, as shown by Figure 9.

I claim:

1. A trash rake attached to a flexible cable which is operable to raise and lower the rake on a rack, said cable permitting swinging movements of the rake toward and from the rack while it is being raised and lowered, so that the rake is conformable to a mass of débris on any portion of the rack, the rake comprising, in combination, a bail attached at its upper end to said cable and having spaced apart bearings at its lower end, a rake head having alined axle arms at its opposite ends coaxial with the head and journaled in said bearings, rake teeth fixed to the head, wheels journaled on the axle arms and adapted to run on bars of a rack, the teeth projecting outward from the peripheries of the wheels, to enter spaces between other rack bars, the axis of the rake head and the peripheries of the wheels being concentric with each other, so that the projection of the teeth from said peripheries is invariable and is not affected by swinging movements of the bail, complemental stop members on the bail and head adapted to abut each other and positively support the teeth in a load-raising position when the rake is rising, and separable to permit the teeth to yield when the rake is falling, and automatic forcing means adapted to force the teeth toward a load-raising position and cause them to dig into a mass of débris on the rack, during the initial upward movement of the rake.

2. A trash rake attached to a flexible cable which is operable to raise and lower the rake on a rack, said cable permitting swinging movements of the rake toward and from the rack while it is being raised and lowered, so that the rake is conformable to a mass of débris on any portion of the rack, the rake comprising, in combination, a bail attached at its upper end to said cable and having spaced apart bearings at its lower end, a rake head having alined axle arms at its opposite ends coaxial with the head and journaled in said bearings, rake teeth fixed to the head, wheels journaled on the axle arms and adapted to run on bars of a rack, the teeth projecting outward from the peripheries of the wheels, to enter spaces between other rack bars, the axis of the rake head and the peripheries of the wheels being concentric with each other, so that the projection of the teeth from said peripheries is invariable and is not affected by swinging movements of the bail, stop dogs fixed to the bail adjacent the bearings thereon, stop lugs fixed to the head and adapted to abut said dogs, and springs connected with end portions of the bail and head and adapted to force the lugs toward and against the dogs, the arrangement being such that the said dogs, lugs, and springs cause a positive support of the teeth in load-raising position when the rake is rising, and permit the teeth to yield upwardly when the rake is falling, the springs causing the teeth to dig into a mass of débris on the rack during the initial upward movement of the rake.

3. A trash rake comprising a head having alined axle arms at its opposite ends, teeth fixed rigidly to the head and projecting from one side thereof, a bail having journals at its ends loosely embracing the axle arms, travelers loosely mounted on the axle arms and movable on bars of a trash rake, the teeth being adapted to project between other rack bars, dogs fixed to and projecting from the bail, lugs fixed to the head and adapted to abut said dogs, and resilient means connected with the bail and with the head and adapted to maintain the lugs in yeilding contact with the dogs, said lugs and resilient means positively supporting the teeth in load-raising position when the rake is rising, and permitting the teeth to yield upwardly when the rake is falling.

In testimony whereof I have affixed my signature.

JAMES A. LEONARD.